June 4, 1963  R. V. HALL  3,091,906
POWER LAWN MOWER
Filed April 30, 1962

INVENTOR.
RUSSELL V. HALL
BY Joseph W. Holloway
ATTORNEY

United States Patent Office 3,091,906
Patented June 4, 1963

3,091,906
POWER LAWN MOWER
Russell V. Hall, Post Box 23, Kinderhook, Ill.
Filed Apr. 30, 1962, Ser. No. 191,182
9 Claims. (Cl. 56—25.4)

This invention relates generally to power lawn mower apparatus and, more particularly, to a rotary mower having improved means for expelling grass cuttings from the interior of the mower housing.

Conventionally constructed rotary mowers include a portable housing comprising a substantially flat deck and a downwardly extending skirt. A gasoline engine, or an equivalent rotary power means, is mounted on the upper deck surface; and, a cutter blade is drivingly connected to the engine drive shaft for rotation below the deck in a horizontal cutting plane near the surface of the earth. The aforementioned skirt surrounds the cutter and serves to retain grass cuttings within the mower housing.

In the operation of conventionally constructed mowers of the aforedescribed type, high-speed cutter blade rotation impells grass cuttings upwardly and radially outwardly into contact with the housing deck and skirt, thereby causing moist and sappy cuttings to adhere to the underside of the deck and the inner skirt surface. Within a short time, cuttings accumulate on the interior housing surfaces to form a matted mass of substantial thickness and weight. Unless the accumulated grass is periodically removed by the mower operator, it will cling to the housing until it falls due to its increasing weight or until it is jarred loose. In either case, the accumulated grass is usually expelled through an outlet in the housing onto the lawn surface in clumps. Such clumping of grass cuttings presents an unattractive lawn and in certain instances kills the grass under and adjacent the clumps. For these reasons, lawn raking or similar laborious follow-up operations are often necessary where conventionally constructed mowers are employed. Furthermore, unless the interior of the mower housing is maintained substantially clear of grass cuttings during the lawn mowing operation, recutting and mulching of the grass within the housing will reduce mower efficiency and, in heavy grass stands, may even cause engine stalling. It has also been observed that the weight of accumulated grass may reach such proportions that operator effort and resulting fatigue are very greatly increased. Moreover, the weight of accumulated grass appreciably increases undesirable wheel indentations in finely kept lawns and causes greater damage to grass overrun by the mower wheels.

Heretofore proposed solutions to the aforedescribed grass accumulation problem have involved rotating blades or disks attached to the engine shaft and interposed between the cutter blade and the housing deck to either shield or clean the interior of the housing. It will be appreciated that neither shielding nor cleaning the housing interior provides a complete solution to the several problems set forth above and may, in fact, introduce new problems. Therefore, a general object of the present invention is to provide an improved and completely effective means for preventing grass cutting accumulation on the underside of a rotary mower housing.

Another object is to provide means for forcibly evacuating grass cuttings from a mower housing interior.

Yet another object is the provision of a mower of the type under consideration wherein a curtain of air is interposed between the cutter blade and the interior surface of the mower housing.

Still another object is to provide a mower housing having a pair of chambers and rotary impeller means in one chamber for blowing air into the other chamber in such a manner that grass cuttings are forcibly evacuated from the last mentioned chamber.

A further object is to provide a mower housing having a baffle secured between the underside of the deck and the cutter blade, together with an engine-driven fan above the baffle for inducing air flow through the baffle thereby creating a positive grass evacuating action below the baffle.

A still further object is to provide a mower housing having forced air means for evacuating grass cuttings therefrom about the entire lower periphery of the housing, thereby eliminating undesirable windrowing and the need for a discharge opening in the housing deck or skirt.

A still further object is to provide a mower of the aforedescribed type which is characterized by simplicity of construction, ease, safety and efficiency of operation, and low manufacturing and operating costs.

These and other more detailed objects and advantages and means for their attainment will appear upon reading the following specification and appended claims and upon considering in conjunction therewith the attached drawings to which they relate.

Figures 1, 3:
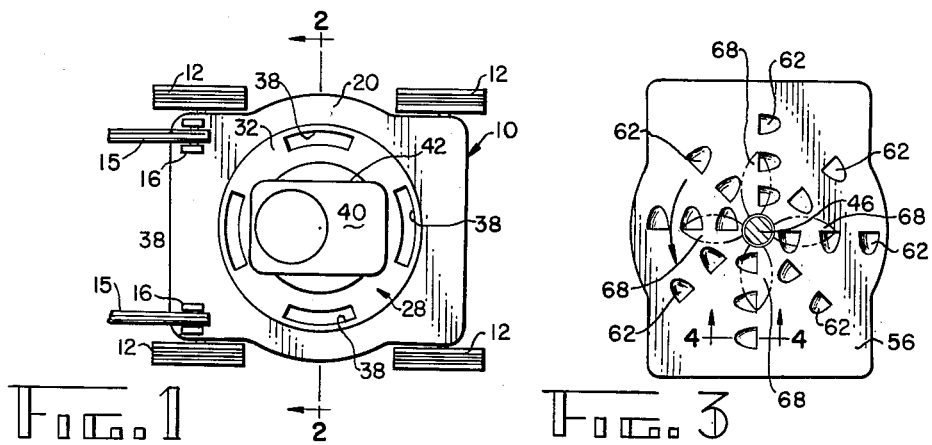
FIG. 1 is a top plan view of a mower constructed in accordance with the present invention.
FIG. 3 is a top plan view of a baffle plate taken generally along lines 3—3 of FIG. 2 and showing an impeller blade in phantom lines; and, FIG. 4 is an enlarged fragmentary sectional view taken substantially along lines 4—4 of FIG. 3.

Referring to the accompanying drawings which illustrate the structural features of one preferred embodiment of the present invention, the numeral 10 generally designates a housing of a power lawn mower apparatus adapted for movement over a lawn surface upon wheels 12. The wheels are removably secured to the housing 10, in the relation shown in FIG. 1, by means of threaded fasteners 14 or the like; and, preferably, the fasteners 14 are cooperable with vertically spaced openings in the housings, not shown, to provide means for selectively regulating the height of the housing above the plane of the underlying lawn surface. The usual operator handle for imparting motive force to the housing 10 is shown in part at numeral 15. Pairs of upright, spaced brackets 16 are rigidly fixed to housing 10 and pivotally connect tubular end portions of the handle 15 to the housing 10.

Figure 2:
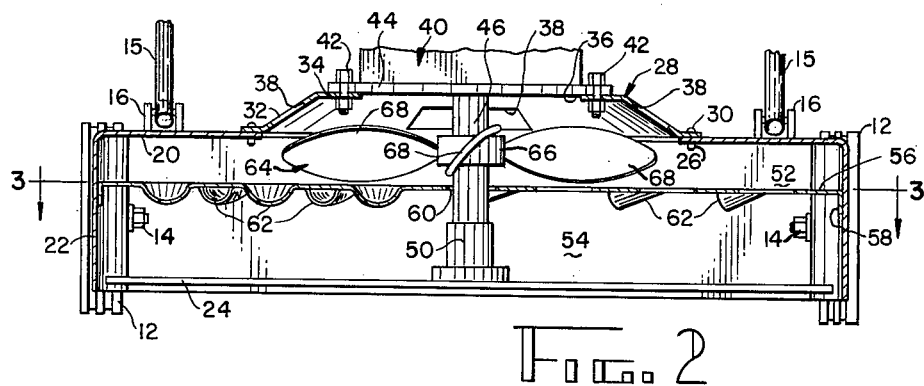
FIG. 2 is an enlarged transverse sectional view taken generally along lines 2—2 of FIG. 1.

As shown in FIG. 2, the housing 10 comprises a generally rectangular member having an integrally formed deck 20 and skirt 22. The deck 20 lies in a horizontal plane and the skirt 22 extends vertically and in depending relation continuously about the perimeter of the deck. As will be hereinafter more fully described, a cutter blade 24 rotates within the housing 10; and, the skirt 22 is spaced in close proximity with the orbital path of the tips of the blade to prevent omnidirectional propelling of grass cuttings and other objects from the housing.

The deck 20 of housing 10 contains a centrally located opening 26, the marginal edge of which supports a frusto-conical engine mounting base, generally indicated in the drawings at numeral 28, and comprising a flanged bottom 30, an inwardly sloping intermediate wall 32, and a horizontal top portion 34. As best illustrated in FIG. 2, the flanged bottom 30 of the engine mounting base seats upon the housing deck 20 about the periphery of aforementioned opening 26 and is rigidly secured thereto by any suitable means. The top portion 34 of the engine mounting base 28 is provided with a centrally located opening 36 which is coaxial with the opening 26 in the housing deck 20. Evenly spaced about the sloped wall 32 are four elongated openings or ports which open to the interior of the mower housing 10 for a purpose to be described. For purposes of disclosing and claiming the present invention, such expressions as "mower housing," "housing interior," and "housing means" may include the space defined by the engine mounting base 28.

A rotary driver means 40 is rigidly mounted above the deck 20 in seated relation with the top portion 34 of the engine mounting base 28 and is secured thereto by means of a plurality of bolts 42, or equivalent means, extending through a mounting flange 44 formed at the base of the driver 40. The driver 40 may comprise a small, manually startable gasoline engine, such as that diagrammatically depicted in FIG. 1; however, it will be appreciated that an electric motor could be employed if desired.

Numeral 46 indicates a shaft which may comprise a depending extension of the engine crankshaft, not shown. Shaft 46 centrally penetrates openings 26 and 36 in deck 20 and mounting base 28, respectively, and at its lower end mounts the aforementioned cutter blade 24. In the usual manner, the blade 24 is nonrotatably, but removably attached to the shaft 46 by means of a mounting adapter 50. The cutter blade 24 generally conforms in size and shape to conventional blades with one essential difference, i.e. the blade is flat throughout its entire length in order to minimize the usual updraft of air and grass cuttings into the interior of the housing 10 as the blade is rotated at high speeds. In spite of the provision of a flat cutter blade, an updraft is unavoidably created whereby wet and sappy grass cuttings and other vegetation is thrown upwardly into the housing 10 toward the deck 20.

As thus far described, the exemplary mower substantially conforms to known rotary mower constructions of the same or similar type. However, as will be appreciated from the following description, the present invention contemplates a rotary mower which is structurally and operationally distinct in several regards. First of all, it will be observed in FIG. 2 that the interior of housing 10 comprises not the usual single compartment but an upper chamber 52 and a lower chamber 54. These chambers are defined in part by a common partition or baffle 56 which is rigidly secured intermediate the top and bottom of the skirt 22. From a comparison of FIGS. 1 and 3, it will be understood that the baffle 56 conforms in outline with the surface of deck 20. About the perimeter of the baffle 56 is a turned-down flange 58 which may be rigidly connected to the skirt 22 by welding, riveting or any equivalent means. The baffle 56 extends across the housing 10 in parallelism with both the deck 20 and the cutting plane of the cutter blade 24. The bottom of the upper chamber 52 is closed by the baffle 56 except for a centrally located circular opening 60, which closely surrounds the engine output shaft 46, and an array of ports 62, the purpose of which will be hereinafter disclosed.

Another distinguishing feature of the present invention is the provision of a rotary impeller or fan, indicated generally in the drawings by the numeral 64. As seen in FIGS. 2 and 3, the impeller 64 is conventionally constructed and comprises a cylindrical hub 66 which supports at their inner ends a plurality of radially extending blades 68 which are rotatable in an orbit parallel to the deck 20 and the baffle 56. The hub 66 is connected to the shaft 46 in surrounding and fixed relation with a portion of the shaft lying in the upper chamber 52. Thus it will be understood that the impeller 64 and the cutter blade 24 are connected to the shaft 46 in spaced-apart relation to one another and in fixed relation with the shaft 46, the impeller being rotatable within the upper chamber 52 and the cutter blade being rotatable within the lower chamber 54.

Preferably the structural and operational characteristics of the impeller blades 68 are selected so that, within the usual operating speeds of the mower engine 40, the impeller will draw air through the aforementioned elongated ports 38 in the engine mounting base 28 into the interior of the upper chamber 52. According to the present invention, the air drawn through the inlet ports 38 will be compressed to a pressure above atmospheric by the action of the impeller 64 and will then be discharged from the upper chamber 52 through the array of ports 62 opening through the baffle plate 56 into the lower housing chamber 54.

Figure 4:
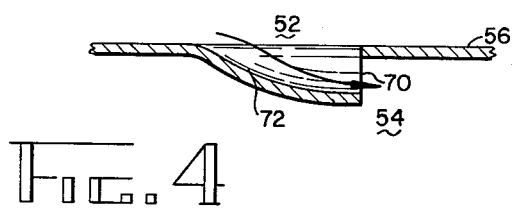

An important feature of the present invention is the provision of a novel means for preventing the accumulation of grass cuttings upon the interior surfaces of the mower housing 10. Stated otherwise, this novel means is intended to maintain the mower housing free from grass cuttings by removing the cuttings from the housing interior in a more positive and forceful manner than heretofore suggested by the prior art. These important features of the invention are accomplished by inducing a flow of air under pressure into the lower chamber 54, and, more precisely by inducing and directing a flow of air into the lower chamber 54 to create a curtain of moving air between the baffle 56 and the cutter blade 24 thereby to provide a pneumatic barrier which cannot be penetrated by grass cuttings thrown upwardly by the revolving cutter blade. The so-called "air curtain" is created by air flowing from the upper chamber 52 through the discharge ports 62 which are shaped and located to provide directional air discharge parallel to and along the underside of the baffle 56, as shown by the arrow in FIG. 4. In its preferred form, the discharge port comprises a mouth 70 and a throat portion 72 and, in top plan, generally resembles a semielliptical scoop stamped or pressed in the baffle. The several discharge ports are arrayed, as shown in FIG. 3, so that the mouths 70 of groups of two and three ports are radially aligned and angularly spaced and open in the same direction as the direction of rotation of the impeller blades 68, indicated by an arrow in FIG. 3. As shown in FIGS. 2 and 3, certain of the ports 62 are arranged proximate the outer edge of the baffle 56 to provide a flow of discharge air against the interior surface of skirt 22. The arrangement of the discharge ports in the baffle and the shape and dimension of the discharge ports may be varied somewhat from that shown in the drawings; however, to assure directional discharge of air into the lower chamber, the mouths 70 of the discharge ports should be located on radii intersecting at the center of the baffle, and the throat 72 of each port should be substantially greater in dimension than the vertical opening of the mouth 70.

From the foregoing description of the shape and arrangement of the discharge ports 62, it will be understood that, during the mowing operation, a cyclone air flow will be created within the lower chamber 54 whereby air compressed in the upper chamber 52 will discharge through the directional ports 62, swirl about within the confines of the lower chamber 62 in a counterclockwise direction, and finally discharge in all directions below the bottom marginal edge of the skirt 22. The rotation of the cutter blade 24 is such that it will not interrupt the aforedescribed cyclonic air flow; however, in contradistinction to known mower devices, the present invention does not rely upon rotating blades or disks to induce and direct a flow of air from the mower housing.

Briefly described, the operation of the aforedescribed mower structure is as follows: When the mower engine 40 is brought up to operating speed, the impeller 64 draws air through the inlet ports 38 and discharges the air under pressure through the discharge ports 62 in the baffle 56 into the lower chamber 54. Grass cuttings impelled upwardly by the cutter blade 24 will strike a curtain of air created by air discharged through the ports 62 along the underside of the baffle 56 thereby preventing the grass from contacting the baffle or adhering thereto. The further action of the air discharged into the lower housing is to create a cyclonic flow of air within the lower housing 54 in which grass cuttings are entrained and along with which the grass cuttings are discharged in all directions from the underside of the mower housing 10.

It will be understood that the above description and accompanying drawings comprehend only general and preferred embodiments of the invention and that various changes in construction, proportion, material and arrangement of the elements thereof may be made without sacrificing any of the above-enumerated advantages or departing from the scope of the appended claims.

What is claimed as new and useful is:

1. In a power mower: a housing including a depending skirt portion; a partition within said housing providing upper and lower chambers therein; said partition being disposed between the top and bottom of said skirt portion; rotary driver means carried by said housing; said driver means having a rotary output shaft, rotary cutting means connected to said output shaft and disposed in said lower chamber; rotary impeller means connected to said output shaft and disposed in said upper chamber; said partition having a plurality of openings communicating said chambers.

2. The invention defined in claim 1 wherein, said skirt portion extends continuously about said housing; and the outer edge of said partition is attached to said skirt portion.

3. The invention defined in claim 2 wherein certain of said openings are located proximate to the outer edge of said partition and to said skirt portion.

4. The invention defined in claim 3 wherein said openings are radially and angularly spaced about the center of said partition.

5. The invention defined in claim 1 wherein said partition is attached between the top and bottom of said skirt portion, said skirt portion providing a surrounding wall for both of said chambers.

6. The invention defined in claim 1 wherein said skirt portion depends from a deck portion of said housing; and said partition extends completely across said housing and in spaced relation to said deck portion.

7. The invention defined in claim 6 wherein the shape of the marginal edges of said partition and deck portion substantially correspond.

8. The invention defined in claim 6 wherein a substantial portion of said impeller is disposed below said deck portion.

9. The invention defined in claim 1 wherein said housing includes an upper deck portion which carries a hollow frusto-conical base mounting said rotary driver means; said upper chamber being defined in part by said base; and said base having openings communicating said upper chamber to atmosphere.

References Cited in the file of this patent

UNITED STATES PATENTS

| | | |
|---|---|---|
| 2,149,463 | Orr | Mar. 7, 1939 |
| 2,766,573 | Shewmon | Oct. 16, 1956 |
| 2,774,439 | Chesser | Dec. 18, 1956 |